United States Patent [19]

Gravelle et al.

[11] Patent Number: 4,486,382
[45] Date of Patent: Dec. 4, 1984

[54] METHOD AND APPARATUS FOR MONITORING THE CONTROL RODS OF A NUCLEAR REACTOR

[75] Inventors: Alain Gravelle, Le Plessis Robinson; Jean Marini, Marly Le Roi; Dominique Romy, Paris, all of France

[73] Assignee: Framatome & Cie, Courbevoie, France

[21] Appl. No.: 344,232

[22] Filed: Jan. 28, 1982

[30] Foreign Application Priority Data

Feb. 4, 1981 [FR] France ................. 81 02096

[51] Int. Cl.³ .............................. G21C 7/36
[52] U.S. Cl. ............................. 376/216; 376/240; 376/252; 376/258
[58] Field of Search ............... 376/215, 216, 240, 252, 376/258

[56] References Cited

U.S. PATENT DOCUMENTS

| | | | |
|---|---|---|---|
| 3,237,150 | 2/1966 | Beck | 376/258 |
| 3,303,457 | 2/1967 | Akesson | 376/258 |
| 4,290,849 | 9/1981 | Uesugi | 376/258 |
| 4,314,881 | 2/1982 | Wu | 376/258 |

Primary Examiner—Donald P. Walsh
Attorney, Agent, or Firm—Pollock, Vande Sande & Priddy

[57] ABSTRACT

Method and apparatus for monitoring the movement of the control rods of a nuclear reactor.

The number of steps of movement in either direction of the rod from which the control rod is suspended is counted. According to the height of the step, an indication of the position of the suspension rod and of the control rod. The apparatus comprises devices for measuring the speed of movement of the control rod, for logging variations in speed higher than a given value, and for counting such variations according to their sign. The invention is particularly useful in pressurized water nuclear reactors.

7 Claims, 6 Drawing Figures

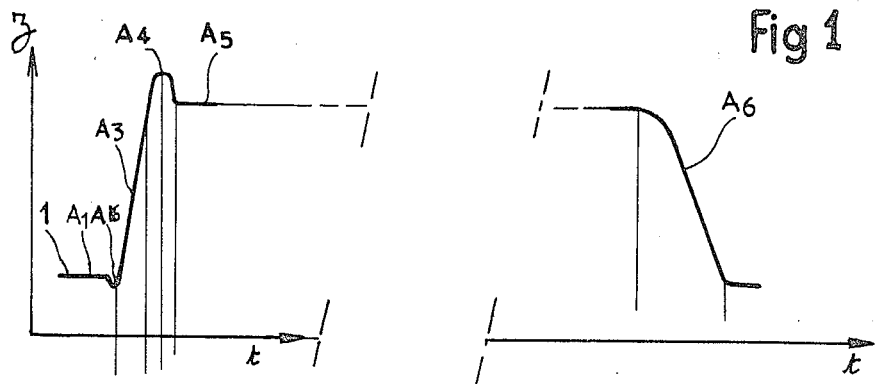
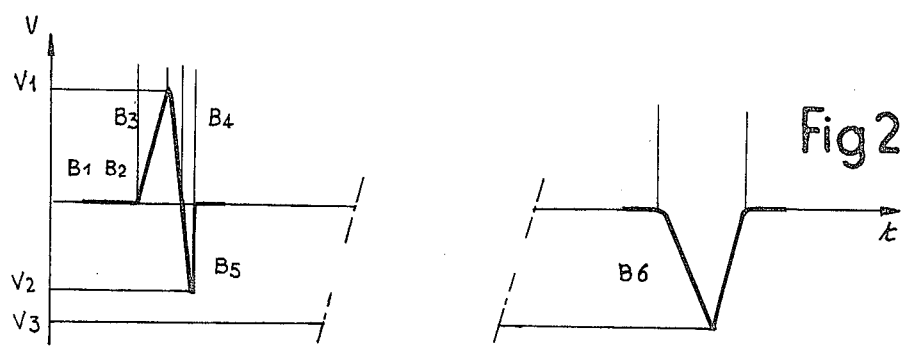
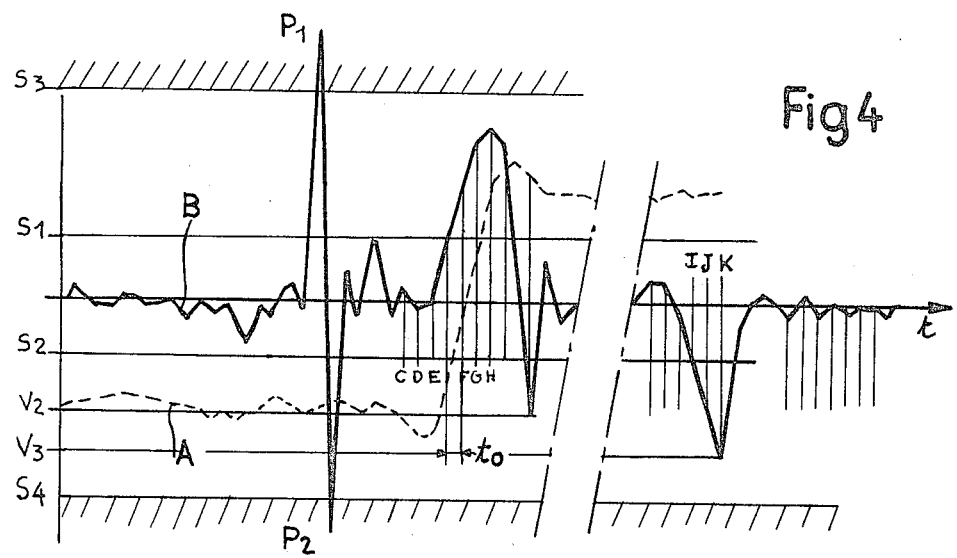

METHOD AND APPARATUS FOR MONITORING THE CONTROL RODS OF A NUCLEAR REACTOR

FIELD OF THE INVENTION

The invention relates to a novel method and apparatus for monitoring the movement of the control rods of a nuclear reactor.

BACKGROUND

In nuclear reactors, particularly of the pressurized water type, the control rods are suspended from suspension rods which pass into guide tubes fixed to the cover of the reactor and which are themselves closed by a cover so as to maintain the entire vessel under pressure, each tube being associated with mechanisms which, by acting on the suspension rod, enable the corresponding control rod fixed to the end of the suspension rod to be raised or lowered.

It is necessary to be able to watch the movement of each control rod constantly so as to be able to determine exactly the position of the rod and consequently of the absorbent spindle constituting the control rod in the fuel assembly.

The logging of the position of the control rod or of the suspension rod which supports it must obviously be effected without contact since it is done during the operation of the reactor.

Various types of apparatus have been used until now to determine the position of the control rods. It has been proposed, for example, to use a series of electromagnetic detectors arranged outside the housing of the control mechanism for the movement of the control rod, in association with a magnetic part of the rod. Thus, the movement of the rod modifies the inductive coupling between the windings of the detectors and generates an output voltage representing the position of the rod. Such a device has the drawback of being relatively bulky since the electromagnetic detectors must be arranged over the whole extent of the movement of the rod. In addition, the position of the rod cannot be determined with great accuracy.

To determine the position of a movable element without contact, particularly in a nuclear reactor, it has also been proposed to use the measurement of the variation in amplitude of an ultrasonic signal after its reflection on the member the movement of which it is desired to estimate. However, due to the fact that the propagation speed of an ultrasonic wave varies according to temperature, these methods are only good for a constant temperature or indeed must integrate a correction phase according to the temperature of the medium, which assumes an exact knowledge of the latter and introduces an additional error factor.

SUMMARY OF THE INVENTION

It is an object of the invention to overcome these drawbacks by means of a novel apparatus which, while using, as known per se, the propagation of an ultrasonic wave, applies a measuring method which permits variations in temperature to be disregarded.

To this end, the invention makes use of features of the control mechanism customarily employed to move the control rods.

This mechanism, normally used for pressurized water reactors, is of the type with two pawls and three coils. It comprises essentially, within a pressure-resistant fluid-tight housing and fixed to the cover of the tank, a transfer mechanism, a support mechanism and a lifting mechanism for the rod. Each mechanism is associated with a magnetic coil located outside the housing, in a protective casing.

Each actuating rod is provided with grooves over a height corresponding to the height of movement of the control rod.

The transfer mechanism and the support mechanism are provided with pawls which are engaged on the grooves of the rod.

When the control rod is in fixed position, the pawls of the support mechanism are engaged, the corresponding coil being energized. The two other coils of the transfer and lifting mechanisms are not supplied.

The engagement of the pawls of the transfer mechanism is actuated by supplying the corresponding coil, and the supporting pawls can then be disengaged. The rod hence takes its support from the transfer pawls, undergoing a slight downward movement which corresponds to the operating play existing in the mechanism.

FIG. 1 shows, as a function of time indicated as abscissae, the variations in height of a point of the rod, indicated by ordinate Oz, for an upward movement by one step, followed by a downward movement.

On the graph A, which represents the movement of a point of the rod, the slight downward movement corresponding to the engagement of the transfer pawls is hence manifested by a dip A2 following the plateau A1 which corresponds to the position of support on the holding pawls.

The control coil of the lifting mechanism is then supplied, this mechanism being constituted by a movable element supporting the transfer pawls and moving upwards over a height of the order of 15 mm until it abuts a fixed element. At this moment, a holding pawl is again engaged and the coil of the transfer pawl is switched off, disengaging it and then the coil of the lifting mechanism, the movable element returning to its initial position.

The lifting movement of the rod, which corresponds to portion A3 of the graph A, is an accelerated movement. At the moment when the movable element of the lifting mechanism comes into abutment against the fixed element, taking into account the inertia of the actuating rod, the letter continues its ascent until the lower surface of the groove comes up against the lower surface of the tooth of the supporting pawl. After this first impact, the actuating rod rebounds downwards and, under the combined effect of gravity and the energy reimparted after the impact, strikes, with another impact, the upper surface of the transfer pawl. This process is shown on the line 1 by a peak A4, followed by a plateau A5 corresponding to the support of the rod on the support pawls.

When it is desired to lower the rod by one step, the movable element of the mechanism is first brought into upper position, by supplying the corresponding coil. At this moment, the pawls of the transfer mechanism are engaged and the support pawls disengaged. The rod drops at this moment through a small distance which corresponds to the operating play, and then the lifting coil actuates the lowering by one step of the movable element supporting the rod.

The movement corresponds to portion A6 of the graph A and occurs without impact.

FIG. 2 shows, as a function of time indicated as abscissae, the variations in speed indicated as ordinates. The graph B representing the variations in speed is composed of a plateau B1 of zero height corresponding to the plateau A1 of the curve A, followed by a slightly negative portion B2 corresponding to the slight movement downwards of the rod at the moment of engagement of the holding pawls, and by a rising flank B3 corresponding to the accelerated lifting movement of the rod.

At the moment when the movable element of the lifting mechanism abuts against the fixed element, the speed becomes zero and then negative, when the actuating rod rebounds downwards, which is manifested by a descending flask B4 and a negative peak B5, the speed then coming back to zero.

The descending movement corresponding to the portion 16 of the graph A1 is manifested by a negative speed which gradually increases in value and then decreases, corresponding to a negative peak B6 of the graph B.

Each time that the rod ascends or descends by one step, its movement therefore takes place under well-determined conditions due to the operation of the mechanism, and is manifested by characteristic speed variations which are reproduced produced each time that it is moved by one step and which are different as the movement takes place upwards and downwards. Considering that each step of movement corresponds to a well-determined height, the method according to the invention for monitoring the movement of the control rods consists of counting the number of steps of movement of the rod in one direction or in the other to deduce, as a function of the height of the step, an indication of the position of the support rod and of the corresponding control rod.

To this end, there is measured constantly, at least at regular intervals, the speed of movement of the rod, counted positively upwards and negatively downwards, the spaced variations of this speed are detected the amplitude of which corresponds to a movement by one step, and the number of variations are totaled, taking into account their sign to deduce therefrom the amplitude of the movement in one direction or in the other.

To detect the variations in speed, in a preferred embodiment, a signal is made to correspond with each speed measurement representative, in magnitude and in sign, of the measured speed and the direction of movement, each signal is compared with two positive thresholds, respectively lower and upper and with two negative thresholds, respectively lower and upper, the lower thresholds corresponding to the amplitude of the background noise, and the upper thresholds to the maximum possible speeds in normal upward or downward movement. The successive signals comprised between two lower and upper thresholds of the same sign are counted and, each time that a minimum number of signals comprised between two thresholds of the same sign are counted, a pulse is sent into a counter corresponding to said sign, the total of each counter indicating the number of steps of the movement effected upwards or downwards according to the sign recorded.

To measure the speed of movement of the rod, it is advantageous to use an ultrasonic system which emits at regular intervals a beam of ultrasonic waves the echo of which on the rod is detected by measuring the transit time of the wave between the emission and the reception of the echo. It is then possible to derive this transit time as a function of the real time so as to develop, at the frequency of the ultrasonic emission, an analog signal representing the speed of movement.

The invention will be better understood through the description of a detailed example of its employment, illustrated by the accompanying drawings.

BRIEF DESCRIPTION OF THE DRAWINGS

In the drawings:

FIG. 1 and FIG. 2 show graphs representing respectively the variations in height of the rod and the speed of movement for upward and downward movements.

FIG. 4 is a diagram showing, as a function of time, an example of the variations in height of a rod and of its speed for an upward movement of one step.

DETAILED DESCRIPTION OF A PREFERRED EMBODIMENT

Figure 3:
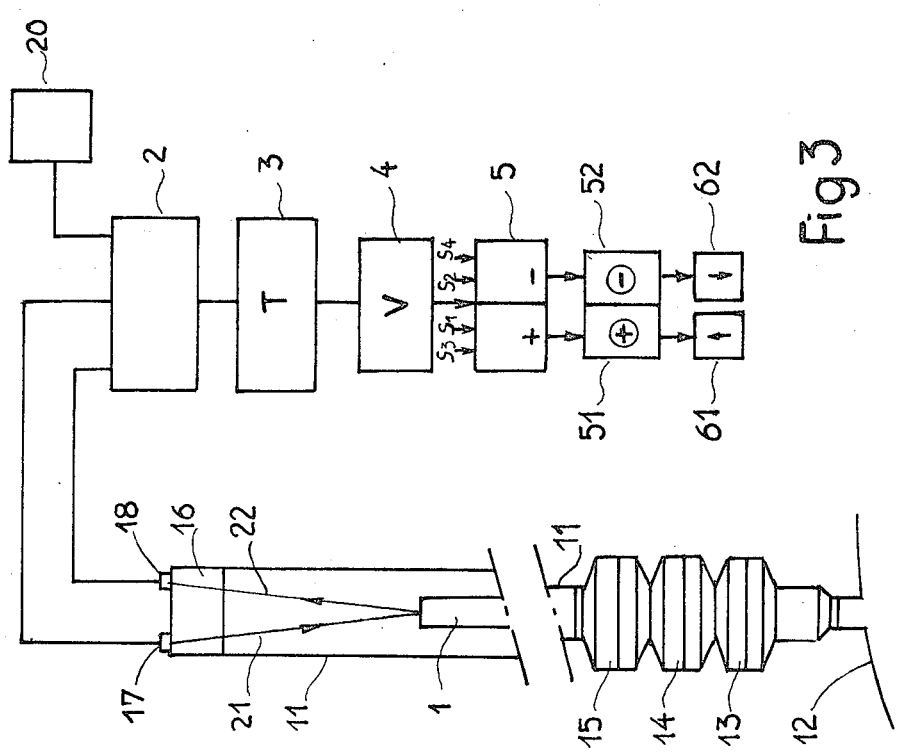
FIG. 3 shows diagrammatically an actuating rod with its monitoring apparatus and a block diagram of the processing of the signals.

In FIG. 3 is shown diagrammatically the upper portion of an actuating rod 1 for control rods moving within a tube 11 fixed to the cover 12 of the tank and provided, at its lower part, with known mechanisms for step-by-step movement of the rod, a support mechanism 13, a transfer mechanism 14 and a lifting mechanism 15.

The tube 11 is provided at its upper part with a cover 16 capable of withstanding the pressure inside the tank. On this cover 16 is placed an ultrasonic system comprising an emitter 17 and a receiver 18.

The measuring installation comprises an emitter-receiver device 2 equipped with a high power emitter and a tuned band amplifier and a frequency selector 20 enabling the emission frequency of the signals to be modified. In a way, the emitter 17 sends along the axis of the tube 11 a beam 21 of ultrasonic waves which is reflected on the upper part of the actuating rod 1, the reflected beam 22 being received by the detector 18.

A device 3 associated with the emitter-receiver 2 enables the duration of propagation T of the wave to be measured, i.e., the time which elapses between the moment of emission of a wave by the emitter 17 and the moment of reception of its echo by the receiver 18.

This time of propagation is obviously proportional to the distance of the end of the rod 1 with respect to the cover 16 of the tube 11, and it would have been possible to rely only on this measurement to monitor the movement of the rod. However, as has been indicated above, the time of propagation of the wave depths on the temperature which does not give a sufficiently accurate indication of the position of the rod.

Each time that an ultrasonic wave is emitted by the emitter-receiver 2, the device 3 emits therefore an analog signal which is a function of the time of propagation T of the wave.

To each signal of amplitude T emitted by the device 3, is made to correspond a signal V representing the speed of movement which is developed by a device 4 producing the derivative of the time of propagation T with respect to the real time (t). This derivative can be formed, for example, by successive subtraction of the amplitudes, the device 4 being connected to this end to a computer.

Thus, the device 4 emits a sequence of signals of amplitude V at regular intervals which correspond to the emission frequency of the ultrasonic waves regulated by the frequency selector 20. Of course, this frequency must be regulated as a function of the distance of the end of the rod with respect to the cover 16, so that the time between two successive emissions is always greater than the propagation time. Generally, a frequency of the order of 60 Hertz. is used.

The variations in the propagation time and of the movement speed can moreover be displayed, and FIG. 4 shows, by way of example, representative graphs (A) of the movement and (B) of the speed as a function of time. In accordance with what has just been indicated, each graph is constituted by a succession of points of which the abscissae are separated by a distance corresponding to the emission frequency.

In FIG. 4 can be recognized the shape of the theoretical graphs shown in FIGS. 1 and 2 and corresponding to a movement of one step upwards. However, in practice, background noise must be taken into account, so that, when the rod is supported on the supporting pawls, the speed generally develops between two thresholds $S_1$ and $S_2$, respectively positive and negative.

However, each movement by one step upwards produces a variation in speed up to a positive level V higher than S1 and a sudden reversal to a negative level V2 below S2.

In the same way, when the rod is moved by one step downwards, the speed, which oscillates between the two levels S1 and S2 corresponding to the background noise, increases in the negative direction of a value V3 (FIG. 2) and then becomes zero again.

On the other hand, it is possible to define an upper level S3 and a lower level S4 respectively above and below the maximum positive or negative speeds which the rod can reach in its upward or downward movement.

It is certain that any variations in amplitude of the speed greater in absolute value then the levels S3 and S4 are due to interference and should therefore be eliminated.

These four speed levels S1, S2, S3, S4 correspond to four thresholds which are set on a comparator device 5 which receives each speed signal emitted by the derivation device 4 and compares it with the four set thresholds.

Each time that the comparison device 5 receives from the device 4 a speed signal which is both higher than the threshold S1 and lower than the threshold S3, it sends a pulse into a totaling system 51. On the other hand, each time that the comparater 4 records a negative speed signal whose absolute value is higher than the threshold S2 and lower than the threshold S4, it sends a pulse into a totaling counter 52.

The totaling counters 51 and 52 are adjusted so as to emit a pulse to a counter respectively 61 or 62, each time that they have totaling a predetermined number of pulses, for example three or four.

In a way, if reference is made to FIG. 4 which shows by way of example a speed curve formed from signals emitted by the derivation device 4, and of which the different points are consequently spaced by an interval TO corresponding to the emission frequency, it is seen that the signals P1 and P2, corresponding to interferences, have been eliminated since they are higher in absolute value than S3 and S4. In the same way, the signals C, D, E are considered as background noise.

On the other hand, each time that it receives one of the signals FGH, the comparator 5 sends a pulse into the totaling counter 51. If the latter is adjusted to three pulses, it is considered from the signal H that there has been detected with certainty a positive speed variation corresponding to an upward movement by one step, and the totaler 51 sends a pulse to counter 61.

At this moment, the totaling counter 52 is neutralized for a certain time, so as not to take into account the negative speeds which correspond, as has been seen, to the stop of the movable element of the lifting mechanism.

The succeeding signals, comprised between S1 and S2, are not taken into account.

On the other hand, starting from the signal I of negative amplitude comprised between S2 and S4, a pulse is sent by the comparator 5 to the totalling counter 52.

The latter, after having received the pulses corresponding to the signals I, J, K, sends a pulse to the counter 62, a downward movement having certainly been detected.

Thus, the counters 61 and 62 indicate the number of steps detected respectively upwards or downwards. Taking into account the height of a step, generally of the order of 15 mm, it is easy to deduce therefrom the height of the rod and, moreover, the counters 61 and 62 may be connected to a visual display device taking into account the height of the step.

The process of recognizing the shape of the speed signal which has just been described may obviously be effected in different ways. It is possible, for example, to use an analog system of threshold comparators, as has been described. But it would also be possible, by means of a digital-analog converter, to transform the measuring signals of the propagation times emitted by the measuring device 8 into numerical signals so as to effect numerically the derivative and the comparison by program on a computer.

The system could also be completed by visual display devices providing on a screen the shape of the displacement curve A and of the speed curve B. In the same way, the counters 61 and 62 would actuate a visual display system of the positions of the control rods of the reactor.

Figure 5:
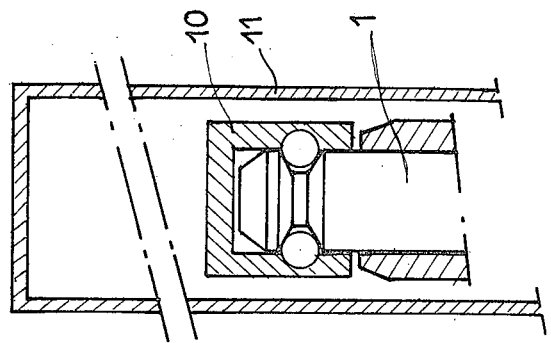
FIG. 5 shows a detail of construction.

However, the invention could also be the subject of other improvements or modifications. Thus, as has been shown in FIG. 5, the actuating rod 1 may be provided at its upper part with a reflecting cap 10 enabling the amount of energy reflected, and consequently the signal/noise ratio, to be increased.

Figure 6:
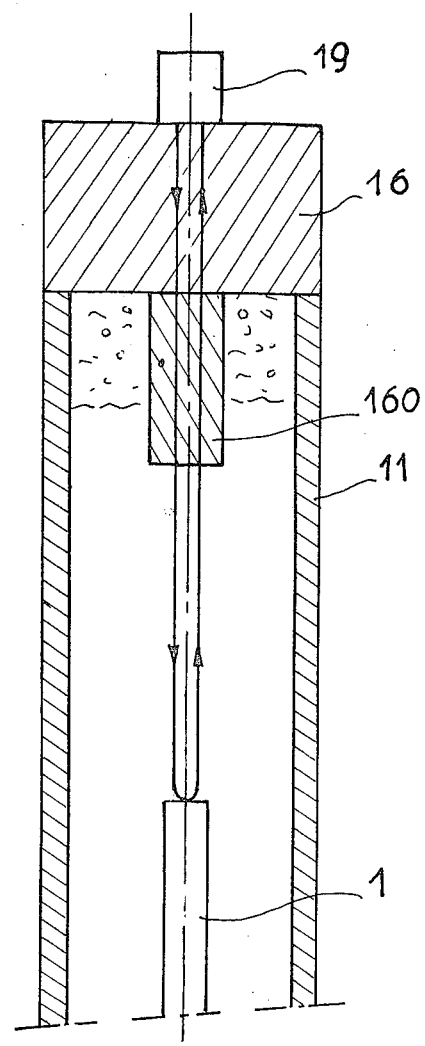
FIG. 6 shows diagrammatically an assembly modification of the apparatus according to the invention.

On the other hand, as has been shown in FIG. 6, the cap 16 may be modified so that the purging hole is excentric, which permits the use of a single emitter-receiver 19 positioned along the axis of the rod. On the inner side, the cap 16 may also be extended by a cylindrical wave guide 160 which dips into the cooling liquid of the reactor, and thus assures the transmission of the ultrasonic waves even if a small amount of gas is present in the upper portion of the tube 11.

It is seen that, due to the fact that the height of the rod is not measured directly, but that reliance is placed on counting only the number of steps of movement upwards or downwards while watching the development of the speed of movement by a shape recognition, the measurements have not to be corrected as a function of temperature, which can vary from one movement unit to another. However, it is possible to consider than in an elemental displacement, the temperature remains constant and that the curves A and B all have the same shape. It is hence possible, for one displacement to regulate to the best extent the thresholds of the comparator 5 enabling the upward or downward movements to be detected.

We claim:

1. Method of continuously monitoring the displacement of the control rods of a pressurized water nuclear reactor in which each control rod is suspended from a suspension rod cooperating with a control mechanism for successive stepwise upward or downward displacements of said rod over a fixed distance corresponding to a displacement step, each step-by-step displacement being followed by a period of support on maintenance pawls, said method comprising the steps of
   (a) measuring constantly and at regular intervals the speed of displacement of said rod, positively in the upward direction and negatively in the downward direction;
   (b) detecting spaced variations in said speed corresponding to a period of support following a displacement step, by applying to them a sign corresponding to the direction of movement; and
   (c) totaling the number of variations detected, taking into account their sign, in order to count the number of displacement steps of said rod and to deduce therefrom, as a function of the height of the step, the amplitude of the displacement in one direction or the other.

2. Apparatus for continuously monitoring the displacement of the control rods of a pressurized water nuclear reactor in which each control rod is suspended from a suspension rod cooperating with a control mechanism for successive stepwise upward or downward displacements of said suspension rod over a fixed distance corresponding to a displacement step.
   (a) said suspension rod being provided with grooves over a height corresponding to the height of movement of a said control rod;
   (b) said control mechanism comprising a transfer mechanism, a support mechanism and a lifting mechanism associated with respective magnetic coils sequentially supplied to effect the selective engagement of pawl means on said transfer mechanism and said support mechanism in said grooves;
   (c) means for measuring constantly and at regular intervals the speed of displacement of said rod, positively in the upward direction and negatively in the downward direction;
   (d) means for logging speed variations having amplitudes greater than a predetermined value, corresponding to a one-step displacement; and
   (e) means for counting said variations as a function of their sign.

3. Method of monitoring control rods according to claim 1, comprising the steps of making each speed measurement correspond to a signal representing, in magnitude and in sign, the speed measured and the direction of movement, comparing each signal with two positive thresholds, respectively lower and upper, and with two negative thresholds, respectively lower and upper, the lower thresholds corresponding to the background noise amplitude and the upper threshold to the possible maximum speeds in normal upwards or downwards movement, counting the successive signals comprised between two lower and upper thresholds of the same sign and, each time that a minimum number of signals comprised between two thresholds of the same time is counted, sending a pulse into a counter corresponding to said sign and whose total indicates the number of steps of the movement effected upwards or downwards according to the sign recorded.

4. Method of monitoring control rods according to claim 1 or 3, said method comprising, to measure the speed of movement of said suspension rod, emitting at regular intervals a beam of ultrasonic waves whose echo on said suspension rod is detected, measuring the transit time of the wave between the emission and the reception of the echo and deriving this transit time as a function of the real time so as to develop at the frequency of the ultrasonic emission an analog signal representing the speed of movement.

5. Apparatus according to claim 2, wherein said measuring means comprises an emitter-receiver apparatus for ultrasonic waves emitted at a given frequency, in the direction of the upper end of said suspension rod, said apparatus also comprising a tube fixed to the cover of the reactor tank and within which said suspension rod moves, an emitter and a detector placed on said tube, a measuring device for the time of propagation of each ultrasonic wave after reflection on said suspension rod and a device for establishing the derivative of the propagation time measured as a function of the real time.

6. Apparatus according to claim 2, wherein said means for measuring the speed of displacement of said suspension rod delivers for each measurement a signal of amplitude and sign which is a function of the speed and of the direction of displacement of said suspension rod, and wherein said logging means comprises a comparator for comparing the speed signal at four preset thresholds, two positive thresholds, respectively lower $S_1$ and upper $S_3$, and two negative thresholds, respectively lower $S_2$ and upper $S_4$, said comparator being provided with two outputs, respectively positive and negative, for the emission of a pulse at the positive output each time that the amplitude of the speed signal is comprised between the positive thresholds $S_1$ and $S_3$ and at the negative output each time that the amplitude of the speed signal is comprised between the negative thresholds $S_2$ and $S_4$.

7. Apparatus according to claim 6, further comprising two accumulating counters, respectively negative and positive, each of which emits a pulse recorded in a respective counter each time that the number of pulses received reaches a preset threshold, wherein the pulses emitted respectively at the positive and negative outputs of said comparator are recorded, the number of pulses recorded in each said respective counter corresponding to the number of displacement steps of the suspension rod, respectively upwards or downwards.

* * * * *